D. CARJULO.
COMBINED HEATING AND COOKING STOVE.
APPLICATION FILED SEPT. 5, 1914.
1,143,504.
Patented June 15, 1915.
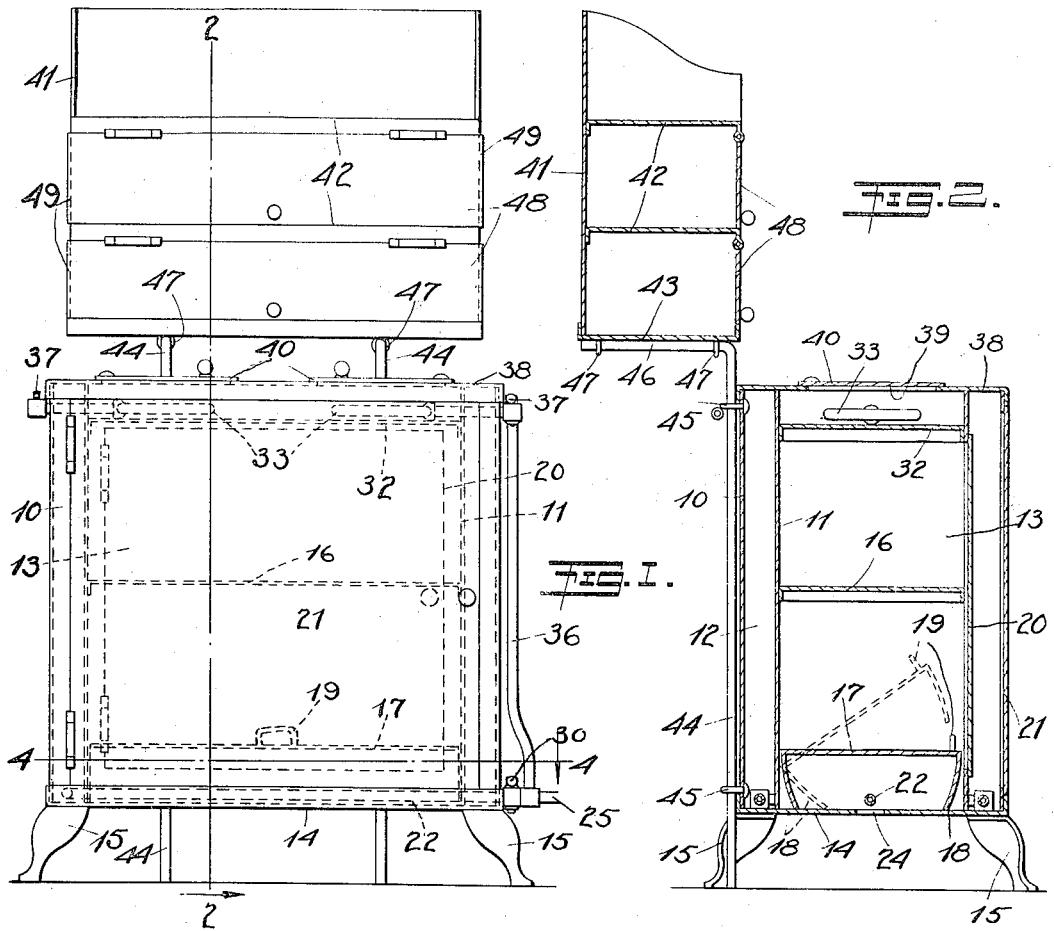
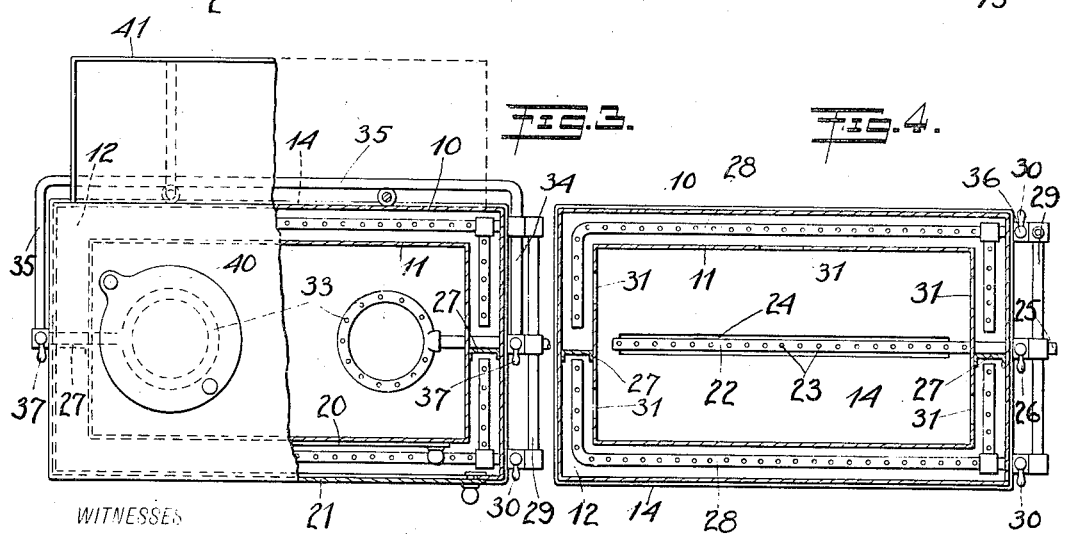
WITNESSES
G. Robert Thomas
J. Edwin Burch.
Domenico Carjulo
BY
ATTORNEYS

UNITED STATES PATENT OFFICE.

DOMENICO CARJULO, OF NEW YORK, N. Y.

COMBINED HEATING AND COOKING STOVE.

1,143,504.  Specification of Letters Patent.  Patented June 15, 1915.

Application filed September 5, 1914. Serial No. 860,422.

*To all whom it may concern:*

Be it known that I, DOMENICO CARJULO, a citizen of the United States, and a resident of the city of New York, borough of Manhattan, in the county and State of New York, have invented a new and Improved Combined Heating and Cooking Stove, of which the following is a full, clear, and exact description.

This invention relates to an improved gas stove and more particularly to a combined heating and cooking stove.

The primary object of the invention is to provide a stove which is equipped with an oven and burners for the purpose of cooking on the top of the stove in the usual manner as well as to provide a heat chamber whereby the stove may be simultaneously used as a cooking and heating stove or independently used for either purpose, with a resultant economy of fuel and the obviating of the necessity of employing a separate heating stove or radiator in a room or rooms equipped with the device.

A further object of the invention is to provide an improved gas stove which may be used as a cooker or heater and which may be embodied in the form of a rectangular or circular stove, and in conjunction therewith to provide an improved arrangement of burners especially adapted for the rectangular stove, while a storage space and heat chamber are provided to support articles of food or otherwise above and in rear of the stove.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of reference indicate corresponding parts in all the views, and in which—

Figure 1 is a front elevation of a combined cooking and heating stove of the rectangular type, constructed in accordance with my invention; Fig. 2 is a sectional view taken on the line 2—2 of Fig. 1; Fig. 3 is a plan view partly in section of the improved stove; and Fig. 4 is a horizontal sectional view taken on the line 4—4 of Fig. 1.

As shown in Figs. 1 to 4, inclusive, my improved stove when made of rectangular form comprises an outer casing 10 and an inner casing 11 so as to produce a surrounding heating space or channel 12 between the casing and an oven space 13 inside of the inner casing. The outer casing is provided with a bottom 14 from which the stove is supported through the medium of legs 15 at a spaced distance from the floor. The oven is provided with a shelf 16, although any number of such shelves may be provided, while at the lower portion of the oven and supported on the bottom 14 of the casing 10 is a shelf 17, the same having its front and rear edges bent downwardly and curved toward each other as shown at 18, to permit tipping of the shelf to the position shown in dotted lines in Fig. 2, by grasping the handle 19 at the front edge thereof. The inner casing forming the oven is provided with a door or closure 20 which is hinged thereto and which is permitted to move to an open position through a door space closed by a hinged door 21 provided for the outer casing and which is larger than the door 20.

The purpose of providing the shelf 17 in the manner described is to permit ignition of the gas or other fuel from a rectilinear burner 22 which projects through the casing from one side to a point near the side of the casing 11 at the opposite side and is provided with any suitable number of burner holes 23 to permit the escape of the gas. This burner is located equi-distantly between the front and rear portions of the casing and over an opening 24 in the bottom 14 which is adapted to supply the necessary oxygen to support combustion. The burner 22 connects with a supply pipe 25 exterior of the casing, the flow of gas or fuel to the burner being regulated by a cutoff 26 of the usual Bunsen type or any other preferred type.

At either side the inner and outer casings are connected by vertical partitions 27 which serve to divide the surrounding chamber or channel 12 into two compartments located at the front and rear, respectively, and extending into the sides. These compartments each receive an angular burner 28, each being substantially of U-shape as shown and having their leg portions terminating near said partitions and in turn placed in independent communication with the supply pipe 25 by a connecting pipe 29 and independent valves or cutoffs 30. The inner and outer casings are provided with a plurality of openings 31 near their bottom and upper portions, respectively, to provide for the complete circulation of air so that as the cold air enters at the bottom and is heated it will pass out at the top in a highly heated condition. The openings 31 also allow for the lighting of the burners 28 after access is gained to the oven space.

The oven space 13 above the shelf 16, or any other number of shelves provided therein, is divided off by a horizontal partition 32 and above this partition a plurality of burners, such as a pair of circular burners 33, are provided, said burners having communication through pipes 34 and 35 with a vertical pipe 36 communicating with the supply pipe and each being capable of separate control by valves 37. The pipe 35 extends to one side rearwardly and horizontally in rear of the stove in communication with a pipe 36 with the pipe 34 at the same side so that all the pipe connections are located at one side of the stove. A receptacle-like top 38 is provided for the stove to fit over the outer casing and said top is provided with suitable openings 39 over the burners 33 to support suitable utensils containing food or material to be cooked or heated over the burners 33. These openings or spaces, however, may be closed by means of covers or lids 40 if desired and especially when the burners 33 are not being used for cooking purposes. By igniting the burners 33 the top portion of the stove may be used for toasting bread or the like and if necessary, in extremely cold weather in addition to lighting the burners 22 and 28, the burners 33 may be lighted to throw out additional heat.

A storage compartment or heating chamber 41 is supported above and in rear of the stove, and as illustrated this chamber comprises a casing of sheet metal the same as the parts composing the stove, although cast metal may be employed, and is provided with a plurality of shelves 42 and a bottom 43 forming an additional shelf and which is employed for supporting the chamber. For this purpose a pair of supporting brackets 44 are held in bolt or rivet eyes 45 secured to the back of the casing 10 at spaced points horizontally and vertically and said brackets are of such length as to project above the top of the stove where they are provided with rearwardly extending horizontal portions 46 passed through similar eyes 47 carried by the bottom of the chamber 41. A pair of upwardly opening hinged doors 48 is provided for the lower heating space of the chamber and these doors or closures are provided with end portions 49 adapted to snap or spring over the sides of the chamber to hold the same in closed positions. The upper shelf is uncovered and in this way various articles, and especially food, may be supported and protected, and heated if desired.

A circular burner 60 is mounted between the inner and outer casings in the heating space or channel 52 adjacent to the bottom 54, the supply of gas or fuel thereto passing through openings 61 and being controlled from the inlet portion 62 in the usual or any preferred manner. Openings 63 are provided in the bottom 54 beneath the burner 60 so as to supply the necessary oxygen to support combustion, and an opening 64 is provided in the inner casing 51 diametrically opposite to the closures so as to render accessible the rear portion of the burner for igniting the same if necessary. Ordinarily when one portion of a burner is ignited the flame will jump from the openings continuously over the area of or around the burner but such openings are provided to avoid any possibility of the entire burner not being lighted.

The inner casing 51 forming the oven space is provided with a top portion 65 and the stove is provided with a top 66 including an annular plate 67 therebeneath to close the heating space between the inner and outer casings and in turn provided with a central opening 68 located above a burner space 69 so that a burner similar to the burners 33 may be provided if desired. A cover or closure 70 is pivoted or otherwise mounted on the top 66 in the same manner as the cover or closure 40, so as to coöperate with the opening 69 for covering or uncovering the same.

It will thus be seen that I have provided a very simple stove structure which can be very economically constructed and which will be especially advantageous for cooking and heating purposes and thus serve all the facilities of two stoves with the advantage of occupying a minimum of space. The device is especially adapted for use in bachelor apartments or in rooms or dwellings where economy of space is necessary, although may be used wherever a stove is desired, as, for instance, in a kitchen to serve for combined heating and cooking purposes so as to obviate the necessity of employing a separate stove or radiator for heating purposes.

Having thus described my invention, what I claim as new and desire to secure by Letters Patent is:—

1. A combined cooking and heating stove comprising an inner and an outer casing of uniform height, top and bottom portions for said casing fitting the top and bottom edges thereof, said casing providing a surrounding heating space between the two, and an oven space within the inner casing, vertical partitions at the sides of the casing dividing the heating space into two compartments, shelves in the oven space, burners at the bottom of said oven space and in each compartment of the heating space, a fuel supply pipe having independent means of connection and control with said burners, the bottom shelf in the oven space being provided with curved front and rear edges depending therefrom to adapt it to be elevated for igniting the burners therein, burners in the space between the upper shelf and the top of the stove having valve communication with said supply pipe at each side of the stove, and the top of the stove having openings therein over said burners, and closures for said openings.

2. A combined cooking and heating stove comprising an inner and an outer casing spaced from one another, top and bottom portions engaging the top and bottom edges of said outer and inner casing, vertical partitions between the inner and outer casing engaging the top and bottom portions, said partitions dividing the space between the inner and outer casing into two compartments, a burner in each compartment at the bottom portion, a burner within the inner casing at the bottom thereof, and a fuel supply pipe to said burners.

3. A combined cooking and heating stove comprising an inner and an outer casing, top and bottom portions engaging the top and bottom edges of said casing, vertical partitions between the outer and inner casing engaging said top and bottom portions whereby the space between the inner and outer casing is divided into two compartments, a burner in the inner casing at the bottom portion thereof, a burner in each of the compartments at the bottom thereof, means for supplying said burners with fuel, said inner and outer casing having openings to permit the circulation of air, burners in the inner casing in proximity to the top portion, said top portion having openings over said burner, and covers for said openings.

In testimony whereof I have signed my name to this specification in the presence of two subscribing witnesses.

DOMENICO CARJULO.

Witnesses:
HARRY H. STAGG,
HARRY F. LAMARS.